Sept. 1, 1953  D. H. MONTGOMERY  2,650,416
MACHINE TOOL
Filed June 18, 1948  5 Sheets-Sheet 4
Fig. 5.
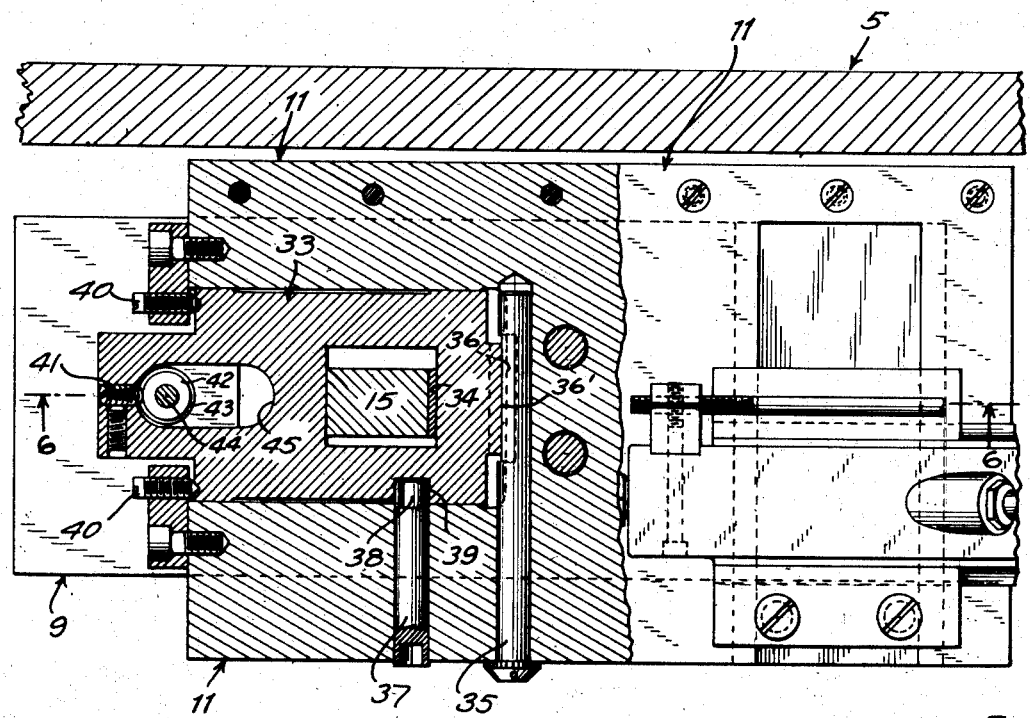
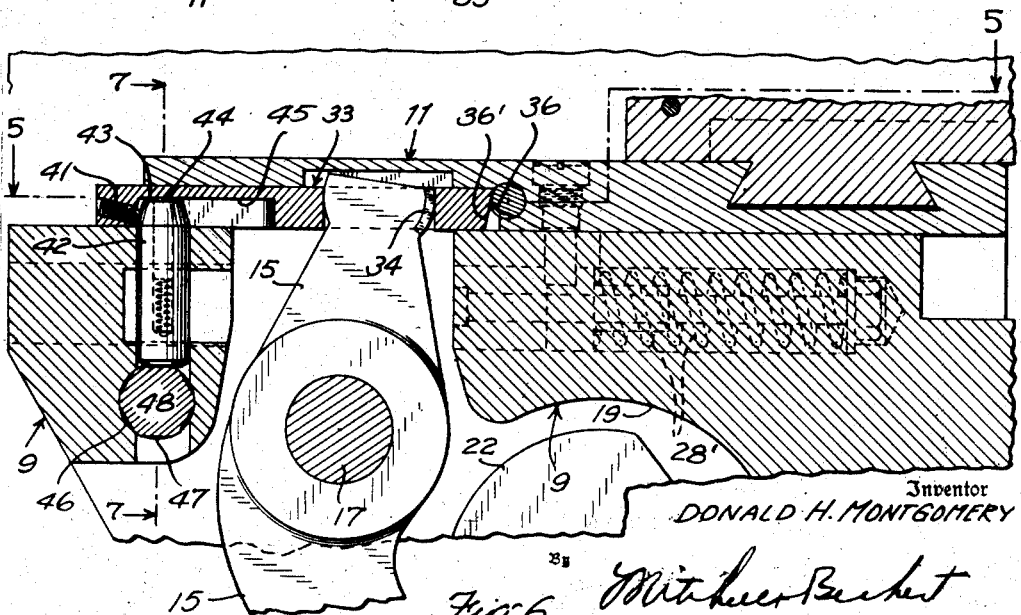
Fig. 6.
Inventor
DONALD H. MONTGOMERY
By Mitchell Bechet
Attorneys

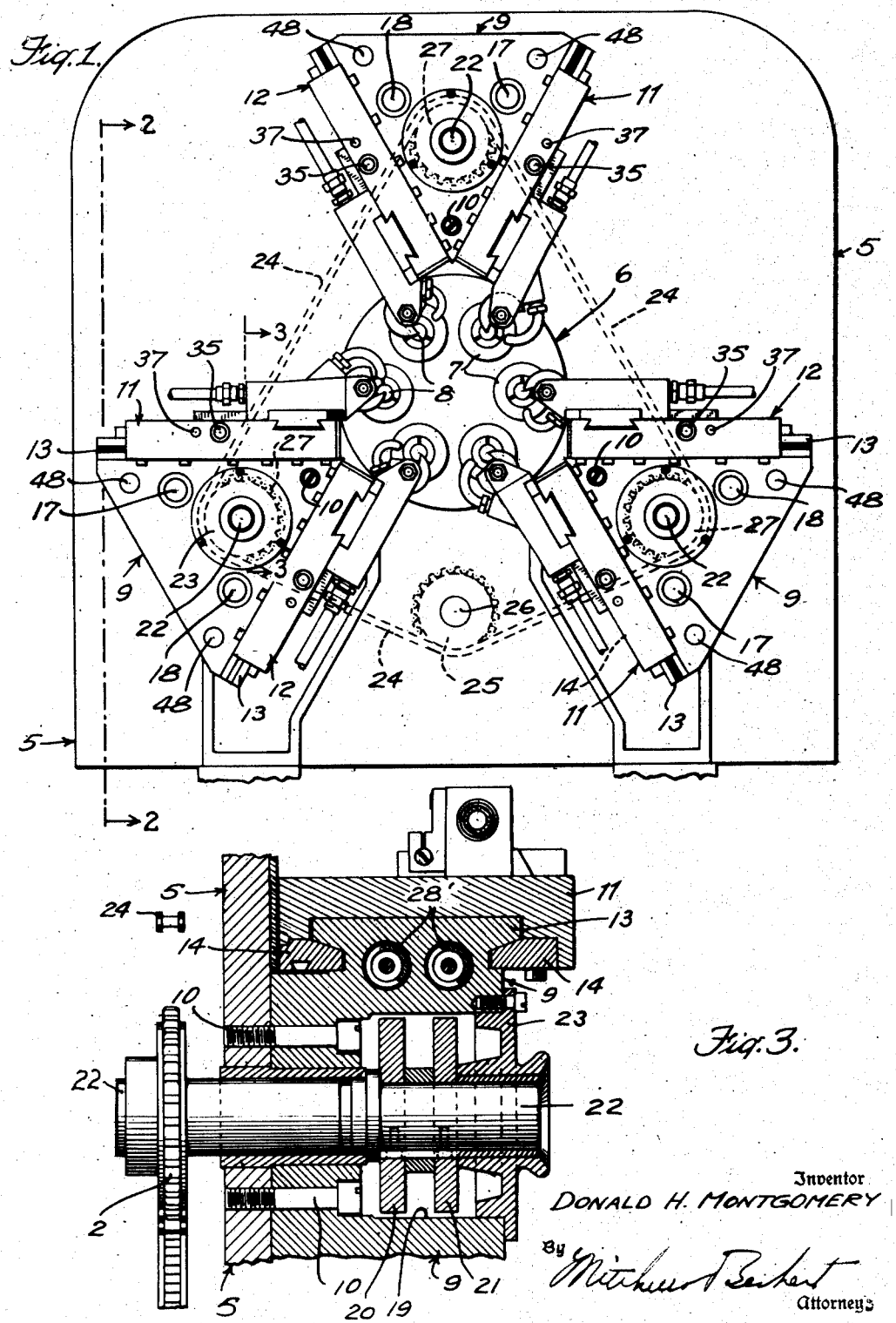

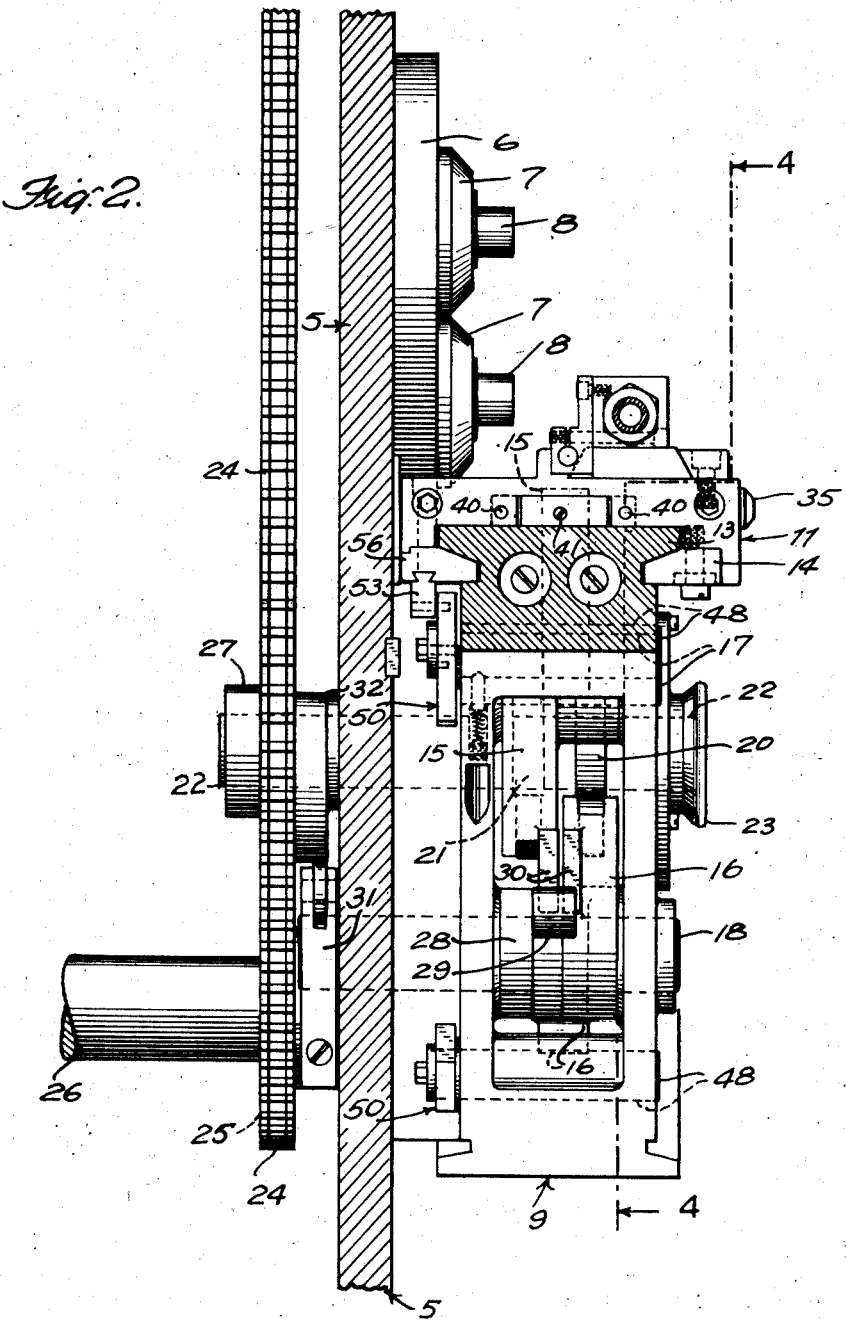

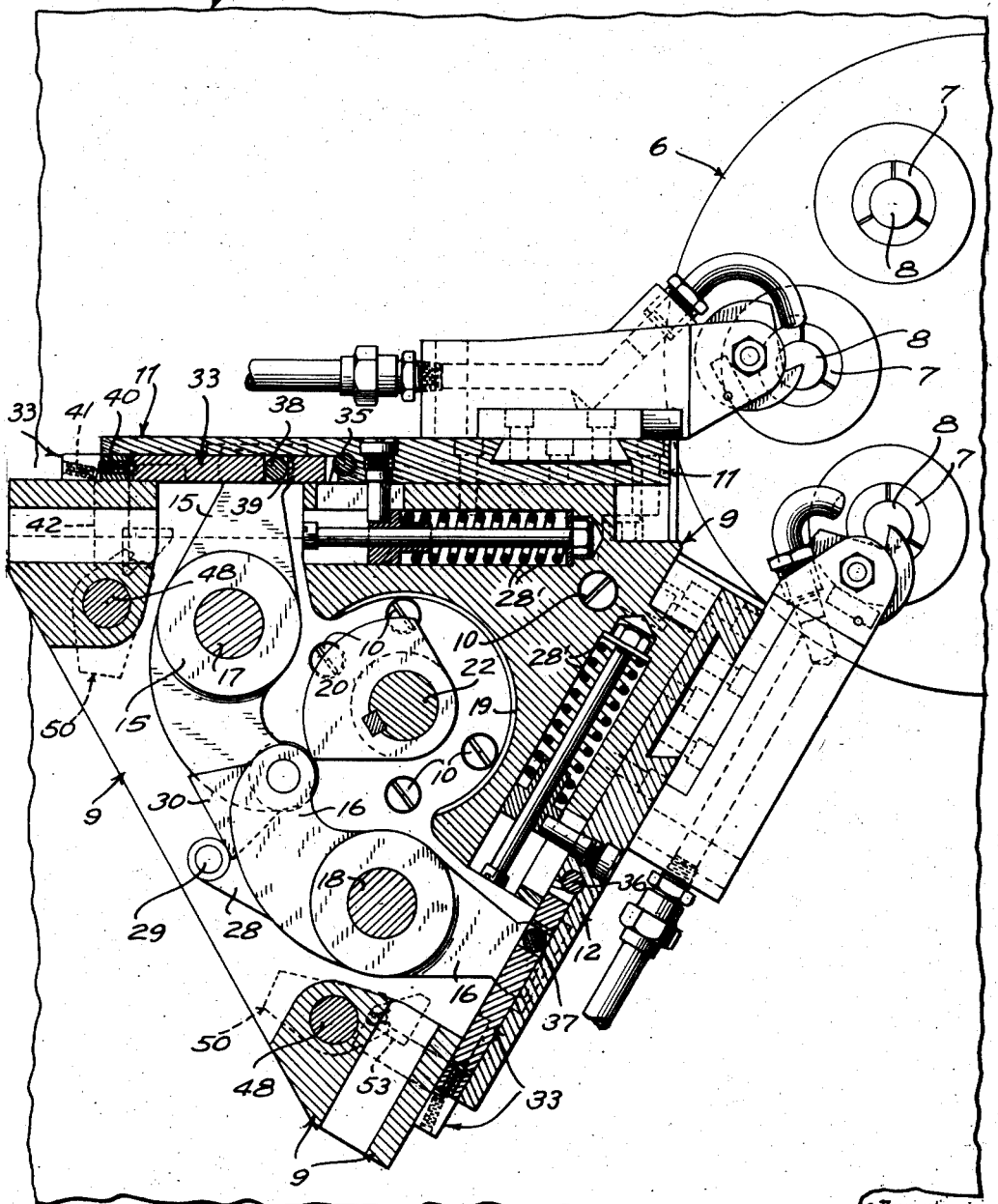

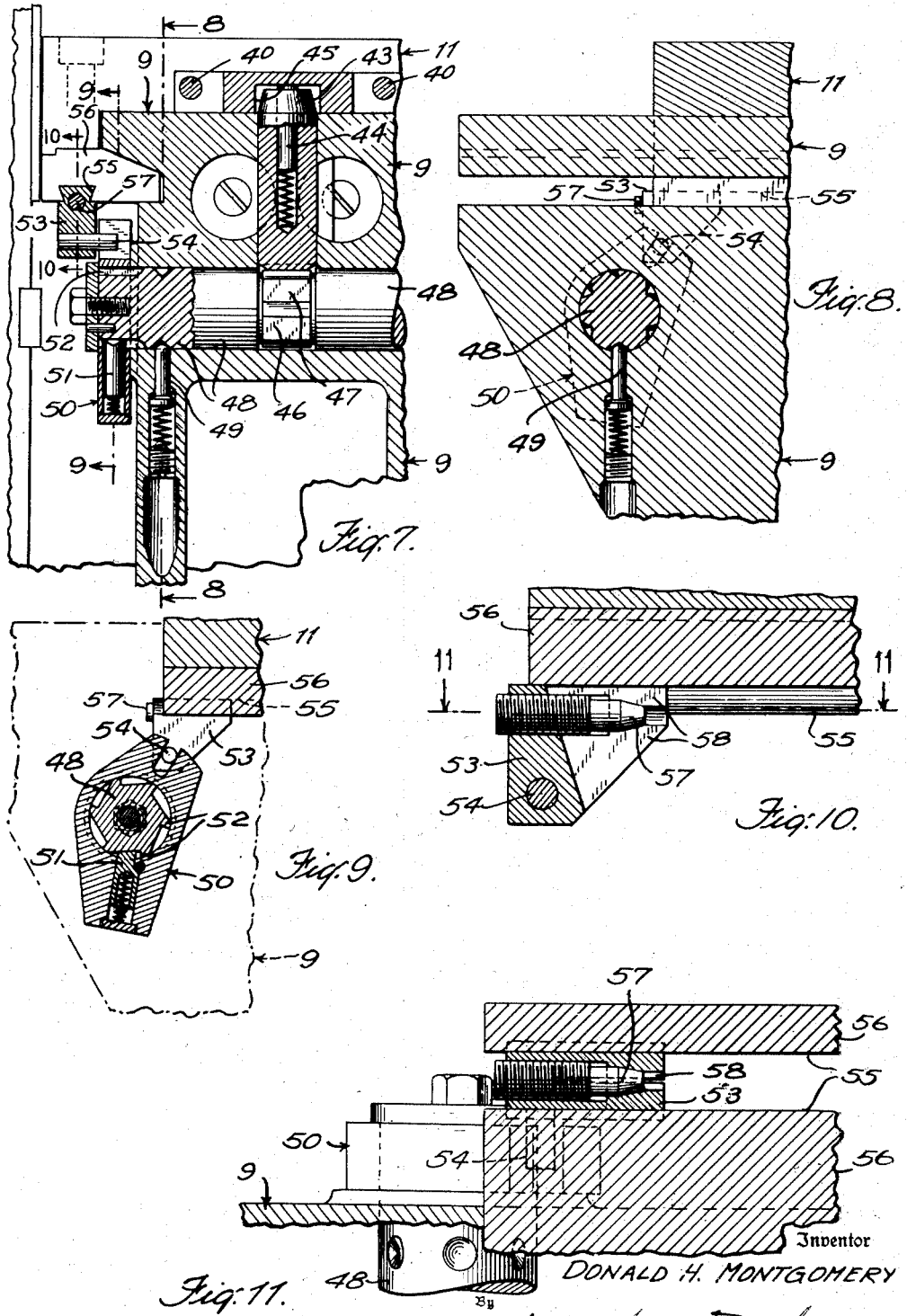

Patented Sept. 1, 1953

2,650,416

UNITED STATES PATENT OFFICE 2,650,416

MACHINE TOOL

Donald H. Montgomery, West Hartford, Conn., assignor to The New Britain Machine Company, New Britain, Conn., a corporation of Connecticut Application June 18, 1948, Serial No. 33,850

20 Claims. (Cl. 29—37)

My invention relates to a machine tool, such as a screw machine, and particularly to a slide or other forming mechanism for such a machine.

It is an object of the invention to provide improved slide or other forming means for a machine of the character indicated.

It is a further object to provide improved slide or other forming means of substantially unitary construction, which may be moved from one position to another on the frame of a multiple spindle screw machine or the like.

It is another object to provide improved slide or other forming means for a machine of the character indicated, having means permitting quick cam changes.

Another object is to provide improved means for adjusting the position of a feed slide or the like without altering the feed mechanism or adjustments thereof.

It is another object to provide an improved forming stop means for limiting the forward feed position of a slide or other forming means whereby in a multiple spindle machine the feed movement may be limited independently for each indexed position of a spindle carrier so as to compensate for inaccuracies in the spindle positions.

Other objects and various features of novelty and invention will be hereinafter pointed out or will become apparent to those skilled in the art.

In the drawings which show, for illustrative purposes only, a preferred form of the invention—

Fig. 1 is a front view of a multiple spindle screw machine showing duplicate slide means in all positions;

Fig. 2 is a fragmentary sectional view, on an enlarged scale, taken substantially in the plane of the line 2—2 of Fig. 1;

Fig. 3 is a fragmentary sectional view, on an enlarged scale, taken substantially in the plane of the line 3—3 of Fig. 1;

Fig. 4 is a sectional view, taken substantially in the plane of the line 4—4 of Fig. 2;

Fig. 5 is a plan view in partial section of the slide mechanism of Fig. 4, the section being taken substantially in the plane of the line 5—5 of Fig. 6;

Fig. 6 is a fragmentary sectional view, taken substantially in the plane of the line 6—6 of Fig. 5;

Fig. 7 is a fragmentary sectional view showing slide stop mechanism, taken substantially in the plane of the line 7—7 of Fig. 6;

Fig. 8 is a fragmentary sectional view, taken substantially in the plane of the line 8—8 of Fig. 7 and showing slide stop indexing mechanism;

Fig. 9 is a sectional view showing the slide stop indexing mechanism and taken substantially in the plane of the line 9—9 of Fig. 7;

Fig. 10 is a fragmentary detail view, taken substantially in the plane of the line 10—10 of Fig. 7 and showing a detail of the slide stop indexing mechanism;

Fig. 11 is a fragmentary sectional view, taken substantially in the plane of the line 11—11 of Fig. 10.

The invention is shown as embodied in a multiple spindle screw machine, but it is to be understood that some features of the invention are applicable to other types of machines, including single spindle machines.

In said drawings, the machine includes any usual or desirable type of frame having a front face or wall 5. A spindle carrier 6 is indexibly mounted in the frame and carries a plurality of rotatable spindles 7—7 (in this case six) for carrying bar stock or other pieces as indicated at 8. When the invention is embodied in a multiple spindle machine, the spindle carrier is arranged for indexing movement, and any desired or conventional type of mechanism may be employed for indexing the spindle carrier, for rotating the spindles, and for other normal screw machine functions, as will be understood.

In the preferred form, I employ a plurality of forming means such as forming slides mounted on a slide bracket or housing, which is preferably detachably secured to the front wall of the frame or to some other suitable part. Such a unitary slide or tool carrying mechanism may be moved from station to station and secured in place. For example, as shown in Fig. 1, three such tool slide units are illustrated, though it is to be understood that any one of the units could be substituted for the other in the preferred form, and it is to be understood that it is not necessary to employ three units, since, in many cases, a single unit will suffice.

As illustrated, each tool slide unit may comprise a tool slide bracket or base 9, which may be rigidly but detachably secured to the frame 5 as by means of screws 10 or the like (Figs. 3 and 4). The bracket 9 is preferably arranged to carry two tool slides 11—12, which may be substantial duplicates of each other, but it is to be understood that some features of the invention are applicable to a forming or other slide in which there is only one slide. The bracket 9 may be provided with dovetails 13, and the slides 11—12 may be provided with dovetail slots formed in part by gibs 14 to slidably fit the dovetails 13, as is more or less common practice. The dovetails 13 on opposite sides of the housing or bracket 9 are preferably arranged at an angle to each other, which is the same angle as that embraced between two spindles of a multiple spindle machine (in this case 60°), so that tools carried by the tool slides 11—12 may each operate on a work-piece in a different spindle, and the feeding movement of the tools by the tool slides may be in a direction radially of the spindle carrier, as will be clear from Figs. 1 and 4.

The slides are actuated by means of feed levers 15—16, mounted on shafts 17—18 carried by the slide bracket. The bracket 9 is recessed or chambered, as shown at 19, for housing one or more face cams 20—21, which may be keyed or otherwise secured to a feed cam shaft 22, which, in the form shown, is rotatably mounted in the bracket 9 or in the frame wall 5 and passes rearwardly through the frame wall 5, as will be clear from Figs. 2 and 3. The chambered portion 19 of the bracket may be closed at the front by means of a substantial cover-plate 23, which preferably has a bearing for supporting the front end of the feed cam shaft 22. It will be clear that when the cover plate 23 is removed, the cams, which may be held in place thereby, may be readily removed outwardly from the chamber 19 while being slid off of the shaft 22. Thus, cam changes may be very easily and quickly made. Each feed cam shaft 22, when more than one is employed, may be driven as by means of a sprocket chain 24, trained over a drive sprocket 25 on the main cam shaft 26, and over sprockets 27 on the cam shafts 22 so that all may be driven in unison. The feed cams rock the levers 15—16 for feeding the slides 11—12, and to assure the drawback of the slides, I may employ a drawback lever 28, carrying a roll 29, for engagement with the flat surfaces 30 on the lever tails. The lever 28 may be fixedly mounted on the shaft 18 (the feed lever 16 being freely rotatable thereon), and the shaft 18 at the rear of the wall 5 may carry a lever 31 (Fig. 2) for actuation by a cam 32 on the feed cam shaft 22 so that when the cam 32 rocks the lever 31, the drawback lever 28 will be rocked so as to positively withdraw the slides. Thus, all of the slides (when a plurality are employed) may all be driven in timed relationship with each other and with all of the other feed functions as determined by the main cam shaft 26.

As has been stated, the slides such as 11 and 12 are fed, in the form shown, by means of cams and levers 15—16. I have provided an improved connection between the levers and the slides to facilitate making adjustments of the positions of the slides without the necessity of altering the relationship between the levers and cams and other parts. Instead of having the actuator, shown for example as the lever 15 or 16, in direct engagement with some permanent or fixed surface on the slide itself, I provide what may be termed a slide thrust block 33 (Figs. 4, 5, and 6), adjustably secured to the slide, and the lever engages the slide thrust block preferably by a Stellite faced tip 34 on the feed surface of the lever. In the form shown, the thrust block 33 is fitted into a recess in the slide such as 11 or 12, and I provide for minute accurate and secure adjustment of the slide relatively to the thrust block. In the form shown, there is a slide adjusting stud 35 (Fig. 5) which is rotatably mounted on the slide 11 and is provided with an eccentric surface 36 for engagement with a co-acting inclined surface 36' at the front of the thrust block 33. It will be clear that, if the thrust block 33 is held stationary and the slide adjusting stud 35 is rotated, the relative positions of the thrust block and slide may be very accurately varied. When the slide and thrust block are positioned as desired, they are locked in that position as by an eccentric lock pin 37 journaled in the slide and having an eccentrically formed end 38 to engage a surface 39 on the thrust block 33. It will be clear, then, that by properly rotating the pins 35—37, the slide 11 may be very accurately adjusted without in any way varying the relationship between the thrust block and the feed lever. As a further holding means between the slide and the thrust block, I may employ screws 40—40 engaging between the thrust block and the slide. The slide feed cams and feed levers are positioned directly beneath or behind the slides so that the feed motions are transmitted substantially directly to the slides, and without twisting or torsional strains on the slides or lever mechanisms. The feed levers always work against the retracting springs 28' so both the jump and feed motions are steady.

In order to make for very accurate work on the piece parts carried by the spindles of an indexing type of machine, I employ an improved forming stop which may be automatically adjusted for each spindle position. Thus, inaccuracies in the positioning of the various spindles relatively to the tool in any one station may be individually and accurately compensated for by my improved stop means. In other words, I employ a separate stop means for the slide corresponding to each indexed spindle position. In the form shown, the individual forming stops are effective on the thrust block 33, and through it on the slide, rather than being effective on the slide itself. As illustrated (Figs. 4-11), the thrust block has an abutment, such as an adjustable screw 41, which is engageable with an adjustable stop member such as the slide stop pin 42. The slide stop pin is adjustable in an up and down direction, as viewed in Figs. 6 and 7, and preferably has a tapered surface 43 for engagement by the stop screw 41 so that a relatively great vertical adjustment of the slide stop pin will make a relatively small horizontal adjustment of the forward slide position. The slide stop pin 42 is urged downwardly as by means of a spring pressed plug 44 carried in the pin and engaging the under surface of the thrust block in the groove or slot 45, which permits the reciprocation of the thrust block slide relatively to the slide stop pin 42. The slide stop pin 42 is held in its various positions of vertical adjustment by flat abutment surfaces 46—47, etc., each of these flats corresponding to a particular spindle so that when any particular spindle is indexed into position corresponding to the position of the slide 11, a flat corresponding to that particular spindle will be in position to hold the stop pin 42. The indexing stop is indexed to bring the appropriate flats into position beneath the stop pin 42 in timed relation with the indexing of the spindle carrier. Such indexing may be and, in the form shown, is performed by the reciprocation of the slide.

The indexing stop 48 may be in the form of a shaft in the bracket or base 9 and resiliently held in indexed positions by means of a spring-pressed detent 49 taking into dimples in the shaft 48, as will be clear. The end of the stop shaft 48 may carry a ratchet lever 50, having a spring-pressed pawl 51 to engage successively behind the ratchet teeth 52 formed on the end of the shaft 48. The ratchet lever may be actuated by means of a block 53, carrying a pin 54, for engagement in a slot in the ratchet lever 50, so that upon the drawback of the slide, the pawl 51 advances the indexing stop one step. The block 53 may be adjustably carried by means of a dovetail slot connection 55 in the gib 56 on the slide 11, and may be held in the desired adjusted position in the dovetail slot connection as by means of a taper nosed screw 57, which engages and spreads the split forward end 58 of the dovetail on the block 53. It will be seen, therefore, that each time the slide moves back on the drawback stroke and the spindle carrier indexes to bring the next spindle up to the station of the slide 11, the indexing stop will be moved by the ratchet mechanism to a new position so as to position a separate flat for each successive indexing motion of the spindle carrier. Thus, by carefully grinding the flats 46—47 on the indexing stop, the forward feed motion of the slide may be limited to just the desired extent to compensate for inaccuracies in the position of each spindle as the spindles successively reach the station corresponding to the position of the slide 11. It will be understood, of course, that this slide stop arrangement, as are other slide stop devices, is made practical by reason of the slight spring or lost motion in the actuating levers, cams, and other connected parts.

It will be seen, therefore, that I have provided slide means which may be moved to different positions on the machine, and which may be used in combination or singly. Cam changing becomes a simple matter and, due to the positioning of the cams directly beneath the slides and behind the levers, the cam motion is transmitted substantially directly to the slides and there is little opportunity for twisting strains or inaccuracies due to torsion stresses in shafts and the like. The cam actuated mechanism preferably coacts with a slide thrust block rather than with the slide itself, so that the slide may be very accurately adjusted without in any way affecting the cam operation of the thrust block arrangement, which in turn moves the slide. The individual stops for the slide corresponding to each spindle position make for extreme accuracy of work turned out in a machine of the character indicated.

It will be clear that certain features of the invention herein disclosed may be employed without others, and that all need not be simultaneously employed in any single machine.

While the invention has been described in considerable detail and a preferred form shown, it is to be understood that various changes may be made within the scope of the invention as defined in the appended claims.

I claim:

1. In a machine of the character indicated, a forming bracket at the front side of a machine frame, two forming slides carried by said bracket for carrying forming tools, said bracket having a chamber therein, the chamber having an open end facing away from the front side of the machine, a shaft extending longitudinally into and projecting toward the open end of said chamber, two disk forming cams in said chamber and carried by said shaft, separate cam-follower means for said cams for feeding said forming slides, the open end of said chamber being of a size to permit the longitudinal insertion and withdrawal of said cams on said shaft, and a cover at the outside of said opening, whereby separate cams for separate slides may be inserted, removed, or adjusted upon a single operation at a single location.

2. In the combination defined in claim 1, said cover having a bearing for one end of said shaft.

3. In a machine of the character indicated, a forming slide bracket having ways at opposite sides thereof converging toward each other, forming slides slidable on said ways, said bracket having a chamber therein, a cam-shaft extending through said bracket into said chamber and including a cam-supporting portion within the chamber, cam means on said cam-supporting portion, slide-feeding levers including cam-follower means within the chamber, a pivot shaft freely supporting one of said levers and freely supported on said bracket, a drawback cam on said cam-shaft, and means coacting with said levers and said drawback cam for retracting said slides, said last-defined means including a drawback-cam-follower arm and a drawback arm secured to said pivot shaft, said bracket having an opening at the front side thereof communicating with said chamber and of a size to permit insertion and withdrawal of said first mentioned cam means, and a cover for said opening.

4. A machine according to claim 1, and means at the rear of said machine frame for driving said shaft.

5. In a machine of the character indicated, a movable member for carrying a forming tool, a thrust block movable with respect to said member and adjustably secured to said member to receive feed motions, and releasable positive locking means effective between said thrust block and said member for locking an adjustable positioning of said thrust block relatively to said member, said last-defined means including two eccentrics journaled in said movable member and with throws having a component along the axis of relative movement of said thrust block and of said movable member, and abutment means on said thrust block for receiving abutment by said eccentrics.

6. In a machine of the character indicated, a forming-slide member, a thrust-block member movable relatively to said forming-slide member, first eccentric pin means for adjusting said thrust-block and slide members relatively to each other in one direction, and second eccentric pin means for locking said thrust-block and slide members in adjusted position, said first eccentric pin means including a cylindrical part journalled in one of said members and an eccentric part engageable with the other member, and said second eccentric pin means including a cylindrical part journalled in one of said members and an eccentric part engageable with the other member, the reaction produced by angular adjustment of one of said cylindrical parts being in a direction to drive said members in one direction of relative movement of said members, and the reaction produced by angular adjustment of the other of said cylindrical parts being in a direction to drive said members in the opposite direction of relative movement of said members.

7. In a machine of the character indicated, a thrust block, means for feeding the same, a forming slide, means for securing said thrust block and forming slide to each other, a slide stop member for limiting the forward feed position of said thrust block, indexible positioning means for said stop member, and means for indexing said indexible positioning means upon a reciprocation of said slide, for the purpose described.

8. In a machine of the character indicated, an indexible spindle carrier, a plurality of spindles carried thereby and indexible one after the other into one position, a slide for cooperation with each spindle when in said one position, slide-actuating means synchronized with the indexing of said spindle carrier and having one cycle of operation for each indexed position of said carrier, an indexing stop having definite successive positions corresponding to the successive spindles when indexed into said one position and including actuating means synchronized with said cycle, and a stop member positioned by said indexing stop whereby said slide stop member may have a definite position for stopping said slide in a definite position relatively to each spindle when indexed into said one position.

9. In a machine of the character indicated, a reciprocable slide, an indexing stop having a plurality of stop surfaces, means for indexing said indexing stop to bring a new stop surface into one definite position upon each reciprocation of said slide, and a slide stop member positioned by each said stop surface on said indexing stop, whereby said slide may be limited in its forward feed motion and such limitation will be dependent upon the indexed position of said indexing stop.

10. In a machine of the character indicated, a frame member and a slide slidable thereon, an indexing stop carried by one of said members, said indexing stop having a plurality of independent stop surfaces, one for each indexed position of said indexing stop, a stop member for coaction with said stop surfaces, whereby said stop member will be independently located for each indexed position of said indexing stop, said stop member being cooperable with said frame member and slide for stopping the latter at positions corresponding to the positions of said stop member.

11. In a machine of the character indicated, a frame member, a tool carrying member movable back and forth in feeding and retracting directions, a stop member for limiting the feeding movements of said tool carrying member, an indexing stop carried by said one of said two first mentioned members and having stop surfaces for coaction with said stop member, there being one such surface for each indexed position of said indexing stop, whereby said stop member may be independently positioned for each indexed position of said indexing stop, said stop member cooperating with said frame member and tool carrying member for stopping the feeding motion of said tool carrying member, and means for indexing said indexing stop once for each feeding and drawback movement of said tool carrying member.

12. In a machine of the character indicated, a frame member, a tool slide slidable thereon, a slide stop member carried by said frame and coacting with said slide for stopping the feed motion thereof, an indexing stop having a plurality of stop surfaces for coacting with said slide stop member for positioning the latter in accordance with the positions of said stop surfaces, means for reciprocating said slide, and means for indexing said indexing stop upon reciprocation of said slide.

13. In a machine of the character indicated, a frame member, a slide slidable thereon, means for reciprocating said slide in feeding and retracting directions, a slide stop pin movable in a direction at generally right angles to the direction of movement of said slide, said slide and reciprocating stop pin having coacting surfaces for limiting the forward feed movement of said slide, the said coacting surface on said slide stop pin being tapered, whereby a large reciprocating movement of said stop pin may vary the stop position of said slide only slightly, an indexing stop having a plurality of stop surfaces for coaction with said slide stop pin, and means for indexing said indexing stop upon reciprocation of said slide.

14. In a machine of the character indicated, a frame member, a slide slidable thereon, means for reciprocating said slide in feeding and retracting directions, a slide stop pin carried by said frame member and reciprocable in a direction generally transverse to the direction of movement of said slide, said pin having a tapered surface thereon, means carried by said slide for coaction with said tapered surface for stopping said slide for limiting the forward feed movement of said slide in accordance with the position of said tapered surface relatively to said slide, an indexing stop rotatably mounted in said frame and having a plurality of abutment surfaces for coaction with said slide stop pin for positioning the latter in accordance with the indexed positions of said indexing stop, and means for indexing said indexing stop upon reciprocation of said slide, for the purpose set forth.

15. As an article of manufacture, a forming-slide bracket having ways at opposite sides thereof converging toward each other, forming slides slidable on said ways, said bracket including a front end and a rear end and having a chamber between said ends and opening to said front end, a removable cover for said opening, a camshaft journaled in said bracket on an axis aligned with said opening, a cam mounted on said shaft, slide-actuating levers pivotably supported in said chamber on spaced axes on opposite sides of said camshaft, and cam-follower means tracking said cam and in drawback-actuating relation with said levers.

16. An article according to claim 15, in which one of said levers is freely mounted on a pivot shaft, and in which said cam-follower means includes a first arm fixed to said pivot shaft and in following relation with said cam, and a second arm fixed to said pivot shaft and in actuating relation with said slides.

17. An article according to claim 15, in which said cam is mounted at a rear portion of said camshaft, whereby upon removal of said cover the front end of said camshaft may be exposed for removable insertion of feed cams for said slides.

18. In a machine of the character indicated, a forming bracket to be secured to a machine frame, said bracket having ways at opposite sides thereof converging toward each other, forming slides slidable on said ways, said bracket having a chamber therein, a shaft extending longitudinally through said housing and into the chamber and including a cam-supporting portion within the chamber, cam means removably carried by said cam-supporting portion of said shaft, separate cam-follower means for separately feeding said slides and including separate parts to be actuated in longitudinally spaced general radial planes including said cam-supporting portion, said bracket having an opening substantially concentric with the shaft for the insertion and withdrawal of said cam means, and a cover for said opening.

19. In the combination defined in claim 18, said cover having a bearing for the front end of said shaft.

20. As an article of manufacture, a forming bracket to be secured to a machine frame, said bracket having ways at opposite sides thereof converging toward each other, forming slides slidable on said ways, said bracket having a chamber therein and open at one end thereof between said slides, a removable cover for said one end, axially aligned bearing means on said cover and on said bracket at the opposite end of the chamber from said cover, a camshaft supported by said bearing means, and levers pivotally carried by said bracket on substantially parallel axes on opposite sides of said camshaft, said levers including cam-follower portions within the chamber and intermediate said cover and said opposite end, said levers further including parts in feeding relation with said slides.

DONALD H. MONTGOMERY.

References Cited in the file of this patent

UNITED STATES PATENTS

| Number | Name | Date |
|---|---|---|
| 1,900,387 | Lewis | Mar. 7, 1933 |
| 2,004,347 | Rupple | June 11, 1935 |
| 2,080,157 | Yager et al. | May 11, 1937 |
| 2,118,024 | Potter et al. | May 17, 1938 |
| 2,187,682 | Drissner | Jan. 16, 1940 |
| 2,265,239 | Jelinek et al. | Dec. 9, 1941 |
| 2,325,571 | Montgomery | July 27, 1943 |
| 2,480,319 | Brodhun | Aug. 30, 1949 |